United States Patent [19]

Colligan

[11] 4,347,450
[45] Aug. 31, 1982

[54] PORTABLE POWER TOOL

[76] Inventor: Wallace M. Colligan, Rte. 1, P.O. Box 28, Preston, Md. 21655

[21] Appl. No.: 215,090

[22] Filed: Dec. 10, 1980

[51] Int. Cl.³ .......................... H02K 7/14; F16C 1/02
[52] U.S. Cl. .................................. 310/50; 310/75 R; 403/122; 408/127
[58] Field of Search ......................... 310/47, 50, 75 D; 30/89, 296 R; 408/127, 226, 238, 239; 403/122, 276, 280; 285/261; 248/288.5

[56] References Cited
U.S. PATENT DOCUMENTS

| | | | |
|---|---|---|---|
| 2,578,517 | 12/1951 | Davis | 285/280 |
| 2,617,278 | 11/1952 | Sindelar | 408/127 |
| 3,101,542 | 8/1963 | Fodor | 408/127 |
| 3,109,238 | 11/1963 | Marks | 310/50 |
| 3,509,629 | 5/1970 | Kidokoro et al. | 310/75 R |

Primary Examiner—J. D. Miller
Assistant Examiner—D. L. Rebsch

[57] ABSTRACT

A portable power tool includes an elongate body portion and a head portion at one end which includes an implement holding chuck. The head portion may be pivotally displaced with respect to the body portion. This is accomplished by the use of a swivelable joint of the ball and socket type between the body portion and the head portion and by an angular coupling in a driving connection between an electric motor in the body portion and the chuck in the head portion. The body portion includes a hand gripping portion of such girth as to provide a comfortable and secure grip by a human hand. The electric motor is disposed within a region of the body portion comprising the hand portion. The electric motor may be driven by a battery.

13 Claims, 4 Drawing Figures

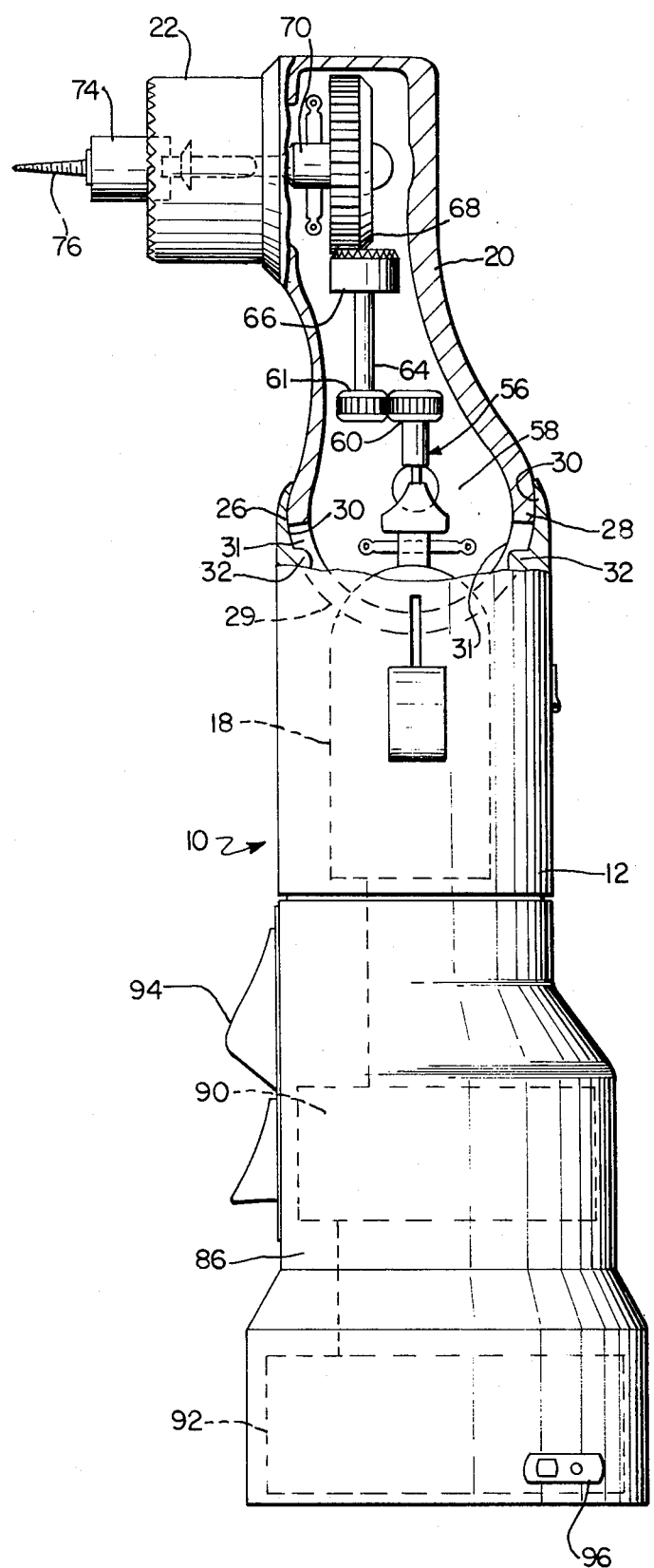
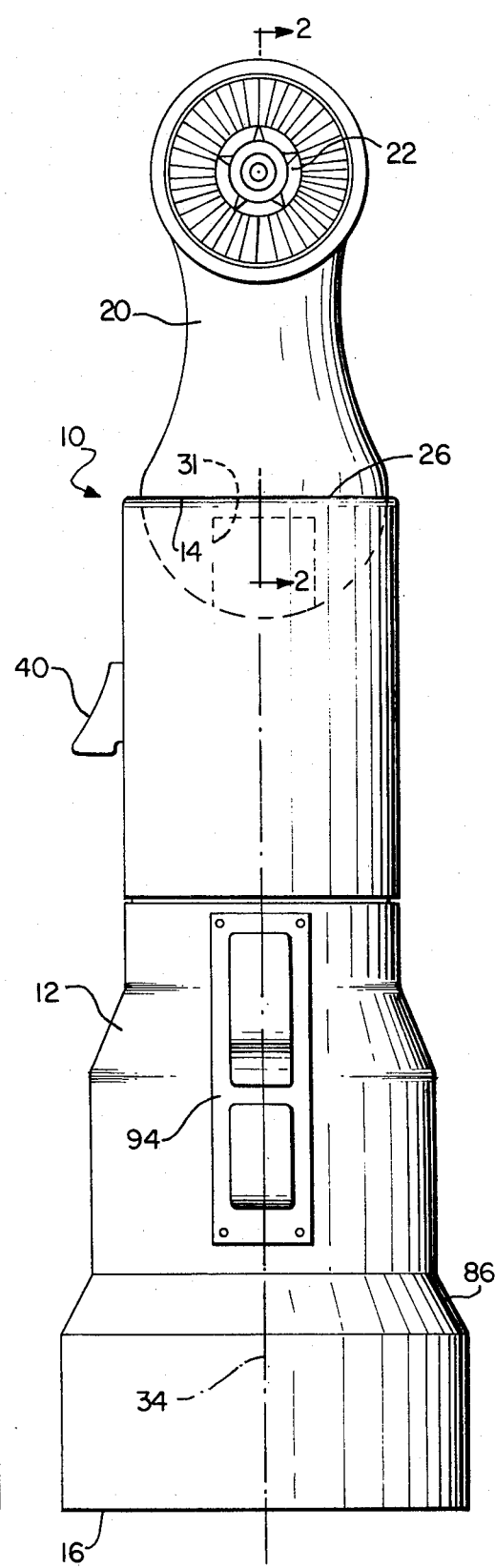
FIG. 2
FIG. 1

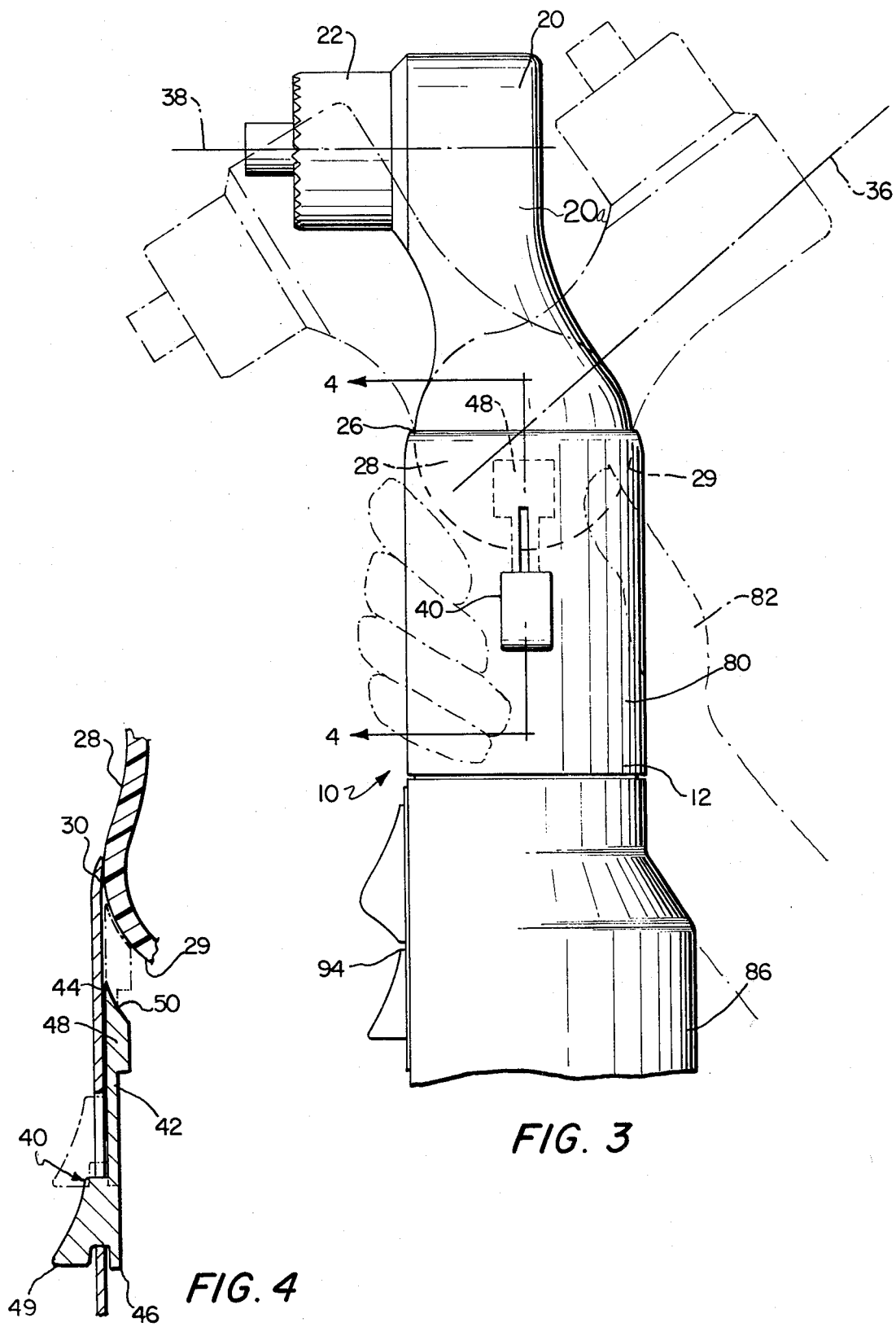

PORTABLE POWER TOOL

BACKGROUND OF THE INVENTION

1. Field of the Invention

The present invention relates to hand tools and in particular hand tools of the type including implement holding chucks which are rotatably driven, usually by an electric motor.

2. Description of the Prior Art

Hand tools with rotatable chucks are well known in the prior art. Hand-held electric drills are a commonly known example. Such tools, however, are often difficult to use or unsuitable for hard-to-reach locations where work must be performed. Examples are between pipes, between ducts, or in areas where pipes and ducts are close to walls or other obstructions. Another example is the process of installing insulation over pipes and ducts where supports or connectors get in the way. Another example is working in hard-to-reach areas of machinery and automobiles.

SUMMARY OF THE INVENTION

It is, therefore, an object of the present invention to provide a portable power tool which is suitable for performing work in difficult-to-reach areas, such as the areas just mentioned.

It is yet another object of the invention to provide such a hand tool in which the position of the head which contains the chuck may be changed with respect to the body of the tool to further enhance the ability to reach into difficult spaces.

It is yet another object of the invention to provide a hand tool which is easy to remove from difficult or tight work areas after a job is completed.

It is yet another object of the invention to provide a hand tool which is compact in size and in which the main body of the tool is readily gripped by the human hand.

It is a further object of the invention to provide a power tool of the foregoing type which has the advantages of compactness, easy grip and flexibility of configuration for reaching difficult spots and which is also cordless so as to further enhance the ability to reach into small spaces to perform work.

The drawbacks of the prior art are overcome and the objects of the invention achieved by the portable power tool of the present invention. The tool includes an elongate body portion having ends and power means, such as an electric motor, in the body portion. There is a head portion adjacent one end of the body, the head including an implement-holding chuck. A driving connection extends between the power means and the chuck. The power tool includes a means for allowing pivotal displacement of the head with respect to the body portion between a normal, aligned position with respect to the body portion and displaced positions in which the head is inclined with respect to the body portion. This pivotal displacement allowing means includes a swivelable joint between the body portion and the head portion of the tool. It also includes an angular coupling in the driving connection, the angular coupling being disposed adjacent the swivelable joint.

The swivelable joint is preferably a ball and socket joint between the head portion and body portion. When the head is in its normal, aligned position with respect to the body portion, the longitudinal axis of the head will be parallel with that of the body portion, but the rotational axis of the chuck will be normal to the axis of the head. That is, the chuck and working implement extend to the side of the tool.

The tool includes means for locking the head in selected angular dispositions with respect to the body portion. This locking means includes an elongated locking member disposed in the body portion for longitudinal sliding movement with respect thereto. In particular, a locking member is slideable between a retracted position, in which no locking is effected, and an extended position, in which a portion of the elongated member engages the head portion to lock the head portion in place. More particularly, the ball and socket joint includes a hollow ball-shaped portion on the head portion of the tool and a socket-shaped portion on the body portion of the tool. The ball-shaped portion provides a semi-spherical surface partially disposed in the interior of the body portion. The forward end of the locking member is shaped for close fitting, face-to-face engagement with the semi-spherical surface of the ball-shaped portion. The forward end of the locking member, when in the extended position, frictionally engages the semi-spherical surface of the head portion to lock the head portion against pivoting movement with respect to the body portion.

The aforementioned angular coupling is of the type which will transmit rotary motion between shafts which are angularly displaceable with respect to each other. This angular coupling preferably takes the form of a universal joint. The electric motor providing power for the tool receives its power from batteries in the body portion of the tool. The body portion includes a hand gripping portion of such girth as to provide a comfortable and secure grip by a human hand. The body portion also includes a base portion of larger girth. The hand and base portions are longitudinally juxtaposed with respect to each other, the hand portion being closer to the head portion of the tool than is the base portion. The electric motor for driving the tool is disposed within a region of the body portion comprising the hand portion, and the battery is disposed within another region of the body portion comprising the base portion.

BRIEF DESCRIPTION OF THE DRAWINGS

FIG. 1 is a front elevational view of a portable power tool according to the present invention.

FIG. 2 is a side elevational view with a partial, cutaway, cross section taken on line 2—2 of FIG. 1.

FIG. 3 is a partial side elevational view similar to that of FIG. 2 showing in phantom lines various positions of the head portion of the tool with respect to the body portion and also showing in phantom lines the gripping of the tool by the hand of a user.

FIG. 4 is a detailed cross-sectional view illustrating the locking device for the tool of the present invention. It is taken on line 4—4 of FIG. 3.

DETAILED DESCRIPTION OF THE PREFERRED EMBODIMENT

Referring to FIGS. 1–3, reference numeral 10 refers generally to the portable power tool of the present invention. Tool 10 includes a body portion 12 having a front end 14 and a rear end 16. Tool 10 includes power means preferably in the form of an electric motor 18 shown in phantom lines in FIG. 2. Tool 10 also includes a head portion 20 at the front end 14 of the body portion 12. Head portion 20 includes an implement holding chuck 22.

The head portion 20 is pivotally displaceable with respect to the body portion between a normal aligned position with respect to the body portion as shown in solid lines in FIGS. 1-3 and displaced positioned as shown in phantom lines in FIG. 3 in which the head portion is inclined with respect to the body portion. Contributing to this pivotal freedom is a swivelable joint 26 between the body portion and the head portion. The swivelable joint takes the form of a ball and socket joint including a hollow ball-shaped portion 28 on the head portion 20 of the tool. This ball-shaped portion 28 includes a semi-spherical surface 29 at least partially disposed within a socket-shaped portion 30 in the body portion 12. As will be apparent from FIGS. 2 and 3, semi-spherical surface 29 is also partially disposed within the interior of the body portion 12. To provide the necessary clearance for the internal drive components of the power tool 10, a slot 31 may extend along part of the semi-spherical surface 29 of the ball-shaped part 28 to provide access to the interior of the head portion 20 in all of its working positions. Resilient flaps (not shown) may be provided to close any part of the slot 31 extending outside the body portion 12 of the tool when the head portion 20 is in its extreme positions. Tabs 32 in the body portion 12 may cooperate with the slot 31 to restrain the swivelable movement of the head portion 20 to one plane.

Body portion 12 has a longitudinal axis 34 as shown in FIG. 1. Head portion 20 also has a longitudinally extending axis 36 as shown in FIG. 3. The implement-holding chuck 22 has a rotational axis 38 which is normal to the axis 36 of head portion 20. In other words, the chuck 22 extends off to the side of head portion 20 and, indeed, off to the side of the tool 10 as a whole, when the head portion is in its normal, aligned position as shown in solid lines in the drawings. It will be apparent that, when the head portion is in this position, its axis 36 is parallel with the axis 34 of the body portion 12.

As will be apparent from the drawing, head portion 20 has a neck portion 20a extending in the direction of axis 36. In particular, neck portion 20a extends between rotational axis 38 of the chuck and the axis about which the head 20 pivots. As will also be apparent from the drawing, the neck portion is of such size that the distance between these rotational and pivot axes is greater than the longest distance across the body portion transverse to axis 34 thereof in the region immediately adjacent the joint 26. In the embodiment illustrated, of course, this longest transverse distance is the diameter of the body portion adjacent the joint 26. Thus, the entire head portion 20 including the neck portion 20a swivels with respect to the body portion.

The power tool 10 includes a locking device 40 for locking the head portion 20 in whatever angular disposition, with respect to the body portion 12, is selected by the user of the tool. Locking device 40 includes an elongated member 42 (see FIG. 4) having a forward end 44 and a rear end 46. Locking device 40 is disposed in the body portion 12 of the tool. The locking member as a whole is slideable between a retracted position as shown in solid lines in FIG. 4 in which no locking is effected and an extended position as shown in phantom lines in FIG. 4 in which an enlarged shoe portion 48 on the forward end 44 of the locking member engages head portion 20 to lock it in place. The sliding movement of locking device 40 is facilitated by a handle 49 which comfortably fits the thumb of the user.

More particularly, the forward end 44 of the locking member is shaped for close-fitting, face-to-face engagement with the semi-spherical surface 29 of the ball-shaped portion 28 of head portion 20, and in particular, engaged shoe portion 48 has a concave forward face 50 thereon to effect such engagement. The forward end 44 of the elongated member 42, and in particular the concave face 50 of the enlarged shoe portion 48, engages semi-spherical surface 29 when the locking member 42 is in its extended position as shown in phantom lines in FIG. 4 to frictionally lock the head portion 20 against pivoting movement with respect to the body portion 12.

Power from the electric motor 18 is transmitted to the chuck 22 by a driving connection generally referred to by reference numeral 56. Driving connection 56 includes an angular coupling 58, i.e., a coupling which is capable of transmitting rotary motion between two shafts, at least one of which is angularly displaceable with respect to the other. Angular coupling 58 in driving connection 56 contributes to allowing the pivotal displacment of the head portion 20 with respect to the body portion 12. In this regard, angular coupling 58 is disposed immediately adjacent the swivelable ball and socket joint 26 between the body portion 12 and head portion 20. Angular coupling 58 is capable of transmitting rotary motion from the electric motor 18 through the head portion 20 and to the chuck 22 even when head portion 20 is in inclined positions with respect to the body portion 12 as shown in phantom lines in FIG. 3. Coupling 58 is preferably a universal joint.

Angular coupling 58 is connected with a shaft 59 which in turn is coupled with gears 60, 61 to offset the drive in view of the forwardmost part of head portion 20 being offset from the axis 34 of the body portion 12. Gear 61 drives shaft 64 which in turn is coupled with pinion gear 66 to provide a 90° ring and pinion drive. In this regard, ring gear 68 which mates with pinion gear 66 drives a shaft 70 to in turn drive the chuck 22.

The chuck 22 is designed to be interchangeable. Different chucks may be provided to adapt the tool for holding drill bits for grinding, sanding and buffing, or for accommodating tools to drive fasteners. In the embodiment shown, the chuck 22 holds a magnetic screw-driving device 74 which holds a screw 76 for driving the screw in tight, hard-to-reach places. Although not illustrated, a releasable coupling may be included between the electric motor and the head portion 20 by which the head portion as a whole may be removed and replaced with a different head portion with a different type chuck suitable for a specialized job.

The power tool 10 includes a hand-gripping portion 80 which is of such girth as to provide a comfortable and secure grip by a human hand 82 (FIG. 3). Preferably, the hand-gripping portion 80 is of cylindrical configuration and has a diameter of approximately 2 inches and an axial length of approximately $2\frac{1}{2}$ to $3\frac{1}{2}$ inches.

Body portion 12 also includes a base portion 86 of substantially larger girth than the hand gripping portion 80. Most of base portion 86 will preferably also be of cylindrical configuration, albeit a stepped cylindrical configuration as shown in the figures, with diameters ranging preferably between approximately $2\frac{1}{2}$ inches to 3 inches. The hand and base portions 80, 86 are longitudinally juxtaposed with respect to each other, the hand portion 80 being closer to head portion 20 than base portion 86.

The electric motor 18 is disposed within a region of body portion 12 comprising hand gripping portion 80. A rechargeable battery 90 for driving electric motor 18 is disposed within another region of body portion 12 which comprises the base portion 86. Base portion 86 may also include a charger 92 for recharging battery 90.

A slideable switch 94 with a locking device is disposed in the body portion 12 for actuating the electric motor 18 to drive the power tool 10. The base portion 86 may include a plug receptacle 96 for delivering energy to the charger 92 for recharging battery 90.

It will be apparent from the foregoing that the power tool as disclosed herein will be especially suitable for reaching into and performing work in small, somewhat obstructed spaces where conventional power tools cannot be used. The elongated, slender nature of the tool in which the body portion itself provides the hand grip facilitates use of the tool in difficult to reach areas. The ability to swivel the head portion 20 with respect to the body portion 12 is particularly useful for reaching into tight areas, as well as around corners and into otherwise inaccessible spots. Also, because the head may pivot, this also facilitates removal of the tool 10 from tight areas where space is at a minimum. That is, the locking device 40 can be released to allow the head to pivot freely for negotiating the tool into difficult to reach spaces and for removing it therefrom. Of course, the locking device also facilitates use of the tool once it has been moved through the minimal space to the working region.

Although the present invention has been described in terms of a specific, preferred embodiment, it will be understood that many other embodiments and many modifications and variations are possible without departing from the spirit and scope of the invention as defined in the appended claims.

What is claimed is:

1. A portable power tool comprising:
   an elongated body portion having ends;
   power means in said body portion;
   a heat portion adjacent one end of said body portion, said head portion including an implement holding chuck;
   a driving connection between said power means and said chuck; and
   means for allowing pivotal displacement of said head portion with respect to said body portion between a normal, aligned position with respect to said body portion and displaced positions in which said head portion is inclined with respect to said body portion, said pivotal displacement allowing means including:
   (i) a swivelable joint between said body portion and said head portion;
   (ii) an angular coupling in said driving connection, said angular coupling being disposed adjacent said swivelable joint;
   said body portion having a longitudinal axis, said head portion also having a longitudinal axis, said longitudinal axis of said head portion normally being parallel with said longitudinal axis of said body portion when said head portion is in said normal, aligned position, and wherein said chuck has a rotational axis which is normal to the axis of said head.

2. A portable power tool as defined in claim 1, wherein said joint comprises a ball and socket joint.

3. A portable power tool as defined in claim 1, including means for locking said head portion in selected angular dispositions with respect to said body portion.

4. A portable power tool as defined in claim 3, wherein said locking means includes an elongated locking member disposed in said body portion for longitudinal sliding movement with respect thereto, said member including a forward end and rear end, said locking member being slideable between a retracted position in which no locking is effected, and an extended position in which a portion of said member engages said head portion to lock said head portion in place.

5. A portable power tool as defined in claim 4, wherein said ball and socket joint includes a hollow ball-shaped portion on said head portion and a socket-shaped portion on said body portion, said body portion having an interior, said ball-shaped portion providing a semi-spherical surface partially disposed in the interior of said body portion, said forward end of said locking member being shaped for close-fitting face-to-face engagement with said semi-spherical surface of said ball-shaped portion, said forward end of said locking member, when in said extended position, engaging said semi-spherical surface of said head portion to lock said head portion against pivoting movement with respect to said body portion.

6. A portable power tool as defined in claim 1, wherein said angular coupling is a universal joint.

7. A portable power tool as defined in claim 1, wherein said power means includes a battery and an electric motor.

8. A portable power tool as defined in claim 7, wherein said body portion includes a hand gripping portion of such girth as to provide a comfortable and secure grip by a human hand and a base portion of larger girth, said hand and base portions being longitudinally juxtaposed with respect to each other, said hand portion being closer to said head portion than said base portion.

9. A portable power tool as defined in claim 8, wherein said electric motor is disposed within a region of said body portion comprising said hand portion and said battery is disposed within another region of said body portion comprising said base portion.

10. A portable power tool comprising:
    an elongate body portion having ends;
    power means in said body portion;
    a head portion adjacent one end of said body portion, said head portion including an implement holding chuck;
    a driving connection between said power means and said chuck; and
    means for allowing pivotal displacement of said head portion with respect to said body portion between a normal, aligned position with respect to said body portion and displaced positions in which said head portion is inclined with respect to said body portion, said pivotal displacement allowing means including:
    (i) a swivelable joint between said body portion and said head portion;
    (ii) an angular coupling in said driving connection, said angular coupling being disposed adjacent said swivelable joint.
    means for locking said head portion in selected angular dispositions with respect to said body portion, said locking means including an elongated locking member disposed in said body portion for longitudinal sliding movement with respect thereto, said member including a forward end and rear end, said locking member being slideable between a retracted position in which no locking is effected, and an extended position in which a portion of said member engages said head portion to lock said head portion in place.

11. A portable power tool as defined in claim 10, wherein said joint comprises a ball and socket joint including a hollow ball-shaped portion on said head portion and a socket-shaped portion on said body portion, said body portion having an interior, said ball-shaped portion providing a semi-spherical surface partially disposed in the interior of said body portion, said forward end of said locking member being shaped for close-fitting face-to-face engagement with said semi-spherical surface of said ball-shaped portion, said forward end of said locking member, when in said extended position, engaging said semi-spherical surface of said head portion to lock said head portion against pivoting movement with respect to said body portion.

12. A portable power tool comprising:
an elongate body portion having ends and having a longitudinal axis extending between said ends;
power means in said body portion;
a head portion adjacent one end of said body portion, said head portion including an implement holding chuck; said chuck having a rotational axis;
a driving connection between said power means and said chuck; and
means for allowing pivotal displacement of said head portion with respect to said body portion between a normal, aligned position with respect to said body portion and displaced positions in which said head portion is inclined with respect to said body portion, said pivotal displacement allowing means including:
(i) a swivelable joint between said body portion and said head portion, said joint having a pivot axis, said body portion having a region immediately adjacent said joint;
(ii) an angular coupling in said driving connection, said angular coupling being disposed adjacent said swivelable joint;
said head portion having a neck portion extending between said rotational axis of said chuck and said pivot axis of said joint, said neck portion being of such size that the distance between said rotational and pivot axis is greater than the longest distance across said body portion transverse to said axis thereof in that region of said body portion immediately adjacent said joint, whereby the entire head portion including the neck portion pivots with respect to said body portion.

13. A portable power tool as defined in claim 12, wherein said head portion has a longitudinal axis, said longitudinal axis of said head portion normally being parallel with the longitudinal axis of said body portion when said head portion is in said normal, aligned position, and wherein said rotational axis of said chuck is normal to the axis of said head.

* * * * *